United States Patent
Menzel

(10) Patent No.: US 9,427,696 B2
(45) Date of Patent: Aug. 30, 2016

(54) REMOVAL OF THERMAL STABLE SALTS FROM ORGANIC SOLVENTS

(75) Inventor: Johannes Menzel, Waltrop (DE)

(73) Assignee: THYSSENKRUPP UHDE GMBH, Dortmund (DE)

(*) Notice: Subject to any disclaimer, the term of this patent is extended or adjusted under 35 U.S.C. 154(b) by 643 days.

(21) Appl. No.: 13/580,904

(22) PCT Filed: Jan. 29, 2011

(86) PCT No.: PCT/EP2011/000413
§ 371 (c)(1),
(2), (4) Date: Oct. 16, 2012

(87) PCT Pub. No.: WO2011/103958
PCT Pub. Date: Sep. 1, 2011

(65) Prior Publication Data
US 2013/0098245 A1    Apr. 25, 2013

(30) Foreign Application Priority Data
Feb. 26, 2010 (DE) ................ 10 2010 009 601

(51) Int. Cl.
*B01D 1/14* (2006.01)
*B01D 3/14* (2006.01)
(Continued)

(52) U.S. Cl.
CPC ............. *B01D 53/1425* (2013.01); *B01D 1/14* (2013.01); *B01D 3/14* (2013.01); *B01D 3/143* (2013.01); *B01D 3/148* (2013.01); *B01D 3/38* (2013.01); *B01D 2252/204* (2013.01)

(58) Field of Classification Search
CPC ........ B01D 3/14; B01D 3/143; B01D 3/148; B01D 3/38; B01D 1/14; B01D 2252/204–2252/20494
See application file for complete search history.

(56) References Cited

U.S. PATENT DOCUMENTS 2,497,309 A * 2/1950 Larson et al. ............. 548/326.1
2,729,588 A * 1/1956 Hannah .................. B01D 3/146
                                                      196/130
(Continued)

FOREIGN PATENT DOCUMENTS

DE    3408851    9/1985
EP    0918049    5/1999
(Continued)

OTHER PUBLICATIONS

MOL Scientific Magazine: CO2 capture—New challenge in refinery industry; #/2008; pp. 12-20.*
(Continued)

*Primary Examiner* — Renee E Robinson
*Assistant Examiner* — Jonathan Pilcher
(74) *Attorney, Agent, or Firm* — Brooks Kushman P.C.

(57) ABSTRACT

Process for removal of salts thermally non-regenerable in a temperature range from 0° C. to 200° C., from organic solvents in an aqueous solution by evaporation, the normal boiling point of organic solvents being higher than that of water, and by enriching the organic constituents existing in the solvent as well as the heat stable salts existing therein in a liquid phase forming by evaporation of water and a portion of the organic constituents of a first vessel, and discharging an evolving vaporous phase from the first vessel. In particular, the liquid phase formed in the first vessel is passed into a second vessel, water in vaporous and/or liquid form being passed into the second vessel, water and another portion of the organic constituents contained in the solvent being evaporated and forming a vaporous phase which is discharged from the second vessel, the heat stable salts being enriched in concentration in the liquid phase forming in the second vessel, and wherein a partial stream of the liquid phase formed in the second vessel is discharged from the second vessel.

13 Claims, 1 Drawing Sheet

(51) Int. Cl.
B01D 3/38 (2006.01)
B01D 53/14 (2006.01)

(56) References Cited

U.S. PATENT DOCUMENTS

| | | | | |
|---|---|---|---|---|
| 3,664,930 | A * | 5/1972 | Pottiez | C10K 1/16 203/37 |
| 4,035,166 | A * | 7/1977 | Van Hecke | B01D 53/1456 423/232 |
| 4,997,630 | A * | 3/1991 | Wagner | B01D 53/1406 423/226 |
| 5,108,551 | A * | 4/1992 | Yan | C07C 213/10 203/28 |
| 5,441,605 | A * | 8/1995 | Beasley | B01D 1/02 159/29 |
| 5,472,679 | A * | 12/1995 | Levinthal et al. | 423/387 |
| 5,837,107 | A * | 11/1998 | Watzenberger et al. | 203/78 |
| 6,152,994 | A * | 11/2000 | Van Grinsven | C07C 213/10 203/42 |
| 6,235,162 | B1 * | 5/2001 | Sharifian et al. | 203/74 |
| 6,508,916 | B1 | 1/2003 | Razzaghi et al. | |
| 7,214,358 | B2 * | 5/2007 | Ravary et al. | 423/242.1 |
| 7,662,215 | B2 * | 2/2010 | Sparling et al. | 95/172 |
| 7,695,594 | B2 * | 4/2010 | Clark | B01D 1/0047 203/2 |
| 8,016,919 | B2 * | 9/2011 | Iijima | B01D 53/1425 95/178 |
| 2001/0054486 | A1 * | 12/2001 | Botta | 156/555 |
| 2005/0034600 | A1 * | 2/2005 | Ravary | B01D 53/1493 95/235 |
| 2006/0054486 | A1 * | 3/2006 | Clark | B01D 1/0047 203/59 |
| 2007/0148068 | A1 * | 6/2007 | Burgers | B01D 53/1425 423/220 |
| 2011/0008229 | A1 * | 1/2011 | Iyengar | B01D 53/1406 423/229 |
| 2012/0125196 | A1 * | 5/2012 | Woodhouse | B01D 53/1425 95/193 |
| 2013/0087041 | A1 * | 4/2013 | Iijima | B01D 53/1412 95/24 |
| 2013/0098245 | A1 * | 4/2013 | Menzel | B01D 1/14 95/205 |
| 2013/0192465 | A1 * | 8/2013 | Trofimuk | B01D 19/0036 95/179 |
| 2014/0260979 | A1 * | 9/2014 | Infantino | B01D 3/343 95/179 |
| 2015/0075376 | A1 * | 3/2015 | Forbert | B01D 9/0036 95/196 |

FOREIGN PATENT DOCUMENTS

| | | |
|---|---|---|
| EP | 1967250 | 9/2008 |
| WO | 0076624 | 12/2000 |

OTHER PUBLICATIONS

International Search Report for PCT/EP2011/000413, English translation attached to original, Both completed by the European Patent Office on Jul. 20, 2011, All together 6 Pages.

* cited by examiner

REMOVAL OF THERMAL STABLE SALTS FROM ORGANIC SOLVENTS

CROSS-REFERENCE TO RELATED APPLICATION

This application is the U.S. national phase of PCT Appln. No. PCT/EP2011/000413 filed on Jan. 29, 2011, which claims priority to German Patent Application No. 10 2010 009 601.6 filed on Feb. 26, 2010, the disclosures of which are incorporated in their entirety by reference herein.

BACKGROUND OF THE INVENTION

1. Field of the Invention

The technical field of the present invention relates to a process for removal of salts thermally non-regenerable in a temperature range from 0° C. to 200° C. from organic solvents, such as aqueous amine solutions, by evaporation. The inventive process is to support a process for the removal of acid gas constituents, such as $CO_2$ and $H_2S$, and reprocess a partial stream from the solvent main stream containing the thermally non-regenerable salts. The thermally non-regenerable salts are formed, for example, by the feed of traces of strongly acidic gases, such as $Cl_2$, HCOOH, $SO_2$, $SO_3$, $NO_2$, etc. together with the input gas supplied to the absorber of the scrubber.

2. Description of the Related Art

Regeneration of a chemical scrubbing medium is achieved by the fact that constituents such as acid gas constituents, e.g. $CO_2$, $H_2S$, HCN, mercaptans, etc. chemically bound in an absorption are thermally reconverted at elevated temperatures into their initial constituents without this causing an alteration of the chemical scrubbing medium in its chemical structure. Thus, it represents a reversible chemical process that can be influenced by a change in temperature.

This principle can be applied in particular to light-volatile, relatively weakly acidic constituents as outlined hereinabove by way of examples. Aqueous amine solutions, e.g. MEA, DEA, TEA, DGA, DIPA, MDEA, or solvents utilized in the Flexsorb process, which is known to an expert, are very often applied as scrubbing media/solvents for such constituents. Thus, thermally regenerable salts are formed, the scrubbing medium/solvent being recoverable in a temperature range from 0° C. to 200° C., and the absorbed gases in the regeneration column being again removed from the solution.

Amine constituents are also utilized as additives in what are called hybrid scrubbing media/solvents, which an expert in general understands to be a combination of physical and chemical scrubbing media, e.g. sulfinol.

If only light-volatile, weakly acidic constituents are available in a given gas stream, one of these afore-mentioned scrubbing media/solvents can be utilized very advantageously for the removal of these acid gas constituents. Such a process is, for example, described in DE 3408851 A1. Here, the removal of $CO_2$ and/or $H_2S$ from gases by means of an aqueous absorption liquid containing methyl diethanol amine is described. Accordingly, the burdened absorption liquid is expanded in at least two expansion stages for regeneration. A gas containing $CO_2$ and/or $H_2S$ is withdrawn at the heads, and the absorption liquid is enriched at the bottom and then passed into a second vessel. The bottom of the final expansion stage contains the regenerated absorption liquid.

In most applications, however, more strongly acidic constituents such as chlorides, $SO_X$ constituents, sulfates, thiosulfates, thiocyanates, organic acids, such as formiates, acetates, etc. entrained by the gas stream also get into the solvent. These more strongly acidic constituents cannot be removed from the solvent by implementing the thermal measures outlined hereinabove and described by way of example in DE 3408851 A1, so that these salt-like constituents termed heat stable salts, and hereinafter also termed HSS, are continually enriched. Hence, this concerns salts thermally non-regenerable in a temperature range from 0° C. to 200° C.

For two different reasons, this enrichment is extremely disadvantageous for the scrubbing process:

On one hand, due to the chemical bond of these constituents with the active scrubbing constituent, e.g. amine, the active scrubbing capacity for acid gas constituents is (at least) proportionally reduced. On the other hand, a rising concentration of HSS constituents leads to a strongly increasing corrosiveness of the scrubbing solution. As a rule, the HSS content for a still tolerable corrosiveness of the solution should not exceed 3% by wt.

On account of these reasons, entrained HSS constituents must be removed and/or sluiced out from the solvent. The simplest, though most expensive possibility is discharging such an amount of solvent that corresponds to the amount of HSS constituents carried in. This procedure is generally termed "repulsive mode". In most cases, however, considerably more solvent gets lost than is sluiced out as HSS. For example, this occurs if the HSS concentration amounts to 3% by wt. and the amine concentration, for instance, amounts to 40% by wt.

According to prior art in technology, a host of different processes is available to selectively remove HSS constituents from the process, e.g. distillative processes and ion exchanger processes, too. Such a process treatment stage is also termed reclaimer or reclaimer unit. One of those processes operating in the most selective manner is the ion exchanger process. However, relatively large amounts of wastewaters are produced there due to scrubbing and flushing processes.

A semi-continuously working evaporator, too, is frequently applied. Such an evaporator operates by feeding a partial stream of the solvent burdened with HSS and withdrawn from the main solution circulation to an evaporator, the chemically reacting scrubbing medium constituent, e.g. MEA from an aqueous MEA solution, supplied to the evaporator being exactly evaporated in the same extent as it is supplied to the evaporator. Obtained here is an amine concentration of e.g. 80% by wt. MEA in the solution. This is the case because under these process conditions the MEA quantity existing in the input stream precisely exists in the gas phase.

Had there been no HSS constituents and no other high-boiling constituents in the solvent input stream, the process could be continued for an arbitrarily long period of time. On account of the HSS constituents existing in the input solution, however, an enrichment of these salt-like constituents occurs in the evaporator.

When a concentration of e.g. 10% by wt. of a salt freight in the evaporator is achieved, the process in the evaporator is reversed from a continuous mode to a discontinuous mode. By addition of a strong base, e.g. NaOH, the HSS constituents chemically bound to amine are bound to the $Na^+$ ion so that the amine hitherto fixed to HSS can also be evaporated. By addition of water vapour and an external heating, the amine solution now existing in the evaporator is evaporated until almost no amine can be detected any more in the gas phase (e.g. <0.1% by vol.).

If this point is reached, the whole charge existing in the evaporator is drained from the evaporator and must be disposed of. However, there still exists a residual concentration of 20 to 30% by wt. of amine in the liquid phase.

If one compares the application of this reclaimer type with the simple repulsive mode outlined hereinabove, it results in a reduction of the amine loss by factor 3 to 4 as compared with the repulsive mode, which would correspond to a reclaimer efficiency degree of 66 to 75% relative to a mere repulsive mode. But the loss of expensive solvent (2 to 10 € per kg) is still quite high. However, in terms of capital investment costs and consumption of utilities, the evaporator reclaimer described above is very cost-efficient as compared with an ion exchanger, even though two evaporators of this kind are generally implemented to ensure permanent reclaimer operation. This is the case, in particular, if the reclaimer steam evolving on evaporation is passed into the sump of an amine regenerator where it can be exploited as stripping steam for thermal stripping of amine from acid gas constituents, thus reducing the external amount of heat required for amine regeneration. Had there not been the residual losses of amine, the evaporator concept described above would be the ideal reclaimer concept for chemically reacting organic solvents in aqueous solution.

SUMMARY OF THE INVENTION

A process making it possible to maintain the advantages outlined hereinabove while simultaneously reducing the losses of solvent would therefore be absolutely advantageous. Providing such a process is the task pursued by the present invention.

DETAILED DESCRIPTION OF THE PREFERRED EMBODIMENTS

Figure 1:
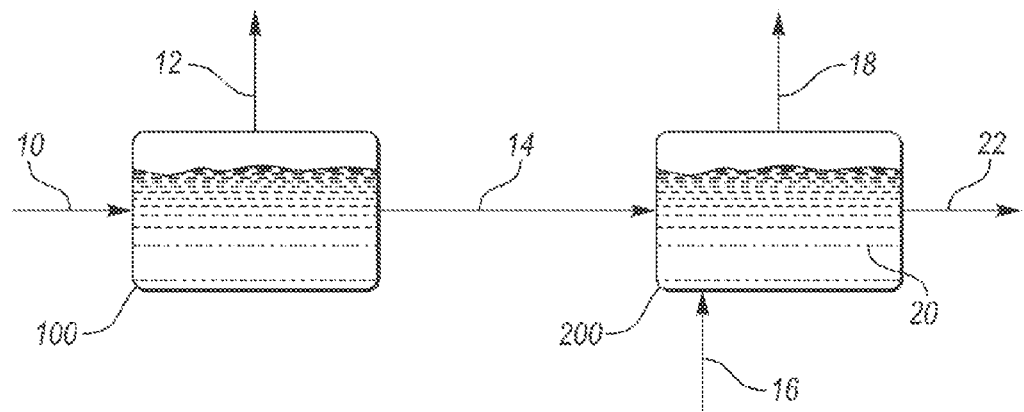
FIG. 1 is a schematic illustration of the process according to one or more embodiments.

As is illustrated in FIG. 1, the inventive task is solved by a process for removal of salts thermally non-regenerable in a temperature range from 0° C. to 200° C., from organic solvents in an aqueous solution 10 by evaporation, the normal boiling point of organic solvents being higher than that of water, and by enriching the organic constituents existing in the solvent as well as the salt-like constituents existing therein in a liquid phase 14 forming by evaporation of water and a portion of the organic constituents of a first vessel 100, and discharging an evolving vaporous phase 12 from the first vessel 100. In particular, the liquid phase 14 formed in the first vessel 100 is passed into a second vessel 200, water 16 in vaporous and/or liquid form being passed into the second vessel 200, water and another portion of the organic constituents contained in the solvent being evaporated and forming a vaporous phase 18 which is discharged from the second vessel 200, said salt-like constituents being enriched in concentration in the liquid phase 20 forming in the second vessel 200, and wherein a partial stream 22 of the liquid phase 20 formed in the second vessel is discharged from the second vessel 200.

The term "vessel" as used in this description should be understood to mean all commonly known devices that can be utilized for evaporation processes.

The temperature at which evaporation is operated, among other factors, depends on the normal boiling point of the organic solvent to be recovered by means of the inventive process. Determination of such parameters is well known to an expert in this field and should be considered as a standard in prior art technology.

In a preferred embodiment of the present invention, the salt concentration of the liquid phase 14 formed in the first vessel 100 is determined, and the liquid phase 14 of the first vessel 100 is passed into the second vessel 200 as soon as the concentration of salt-like constituents of the liquid phase 14 to be carried over has reached a maximally admissible concentration at which the salt-like constituents are still soluble in the liquid phase 14. In particular, the liquid phase 14 of the first vessel 100 is passed into the second vessel 200 as soon as a concentration of the salt-like constituent in the liquid phase 14 of 5 to 35% by wt., preferably 5 to 25% by wt., and more preferably 5 to 15% by wt., and most preferably 8 to 12% by wt., is achieved.

In a further configuration of the present invention, the salt concentration of the liquid phase 20 formed in the second vessel 200 is determined and a partial stream 22 of the liquid phase 20 from the second vessel 200 is discharged as soon as the concentration of salt-like constituents of the liquid phase 20 to be discharged has reached a maximally admissible concentration at which the salt-like constituents are still soluble in the liquid phase 20. In particular, a partial stream 22 of the liquid phase 20 is discharged from the second vessel 200 as soon as a concentration of the salt-like constituent in the liquid phase 20 of 25 to 65% by wt., preferably 40 to 65% by wt., and more preferably 45 to 65% by wt., and most preferably 55 to 65% by wt., is achieved.

The first vessel 100 and/or the second vessel 200 is optionally heated and/or cooled in order to ensure appropriate evaporation.

It is advantageous to provide water 16 in the second vessel 200 before the liquid phase 14 formed in the first vessel 100 is carried over into the second vessel 200. The water 16 to be provided here preferably is boiler feed water originating from other units of an industrial plant and further used at this location. The second vessel 200 is filled only partly with water. The height of the water level influences the time until the correspondingly defined limit concentration of salt-like constituents in the liquid phase 20 formed by evaporation is reached in the second vessel 200 so that the liquid phase 20 is discharged from the second vessel 200. The optimal height of the water level will be determined by an expert in this field through routine tests as the case may be.

With the inventive process, it is of advantage to merely produce a concentrated salt solution depleted in organic constituents as wastewater 30 that encompasses the liquid phase 20 formed in the second vessel 200.

Figure 2:
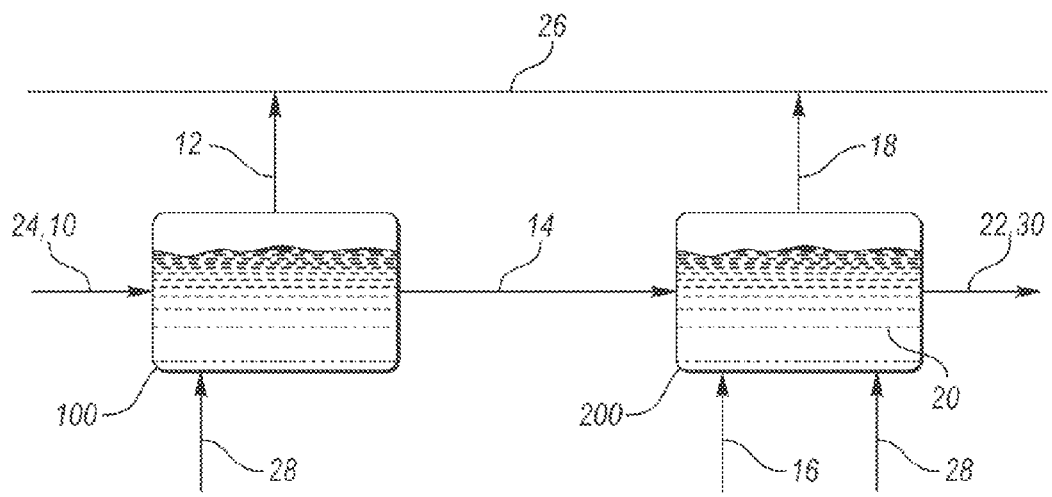
FIG. 2 schematically illustrates a continuously operating mode of the process.

In another embodiment of the present invention, depicted in FIG. 2, merely a partial stream 24 of a main circulating stream 26 of an industrial plant encompassing an organic solvent burdened with thermally stable salts is supplied to the first vessel 100. Furthermore, the vaporous phases 12, 18 of the first 100 and/or second vessel 200 formed by evaporation are returned into a main circulating stream 26 of an industrial plant. To this effect, a prior condensation of these vaporous phases 12, 18 is advantageous. Non-condensable gases are sluiced out and sluiced in, if any, into the process upstream to an absorber arranged in the relevant industrial plant. These vaporous phases 12, 18 generated with the inventive process can alternatively be returned into a stripper sump.

In a further embodiment of the present invention, a continuously operating mode of the process is claimed. Accordingly, the liquid phase 14 formed in the first vessel 100 is continuously passed into the second vessel 200, and water in vaporous and/or liquid form 16 is continuously passed into the second vessel 200, and by way of a controlled supply or discharge of heat, water and portions of the organic constituents contained in the solvent are continuously evaporated, thus forming a vaporous phase 18 which is discharged from the second vessel 200, said salt-like constituents being enriched in concentration in the liquid phase 20 forming in the second vessel 200, and a partial stream 22 of the liquid phase 20 formed in the second vessel 200 is continuously discharged from the second vessel 200 and forms a wastewater stream 30 which encompasses a concentrated salt solution depleted in organic constituents, and the vaporous phases 12, 18 of the first and/or second vessel 100, 200 which are formed by evaporation are returned into a main process stream 26 of an industrial plant.

It is advantageous to feed a strong base, such as NaOH, 28 to the first vessel 100 and/or the second vessel 200.

Furthermore, distillative intermediate stages which can be integrated into the process at any location to ensure a further clean-up of the resulting process streams are optionally conceivable.

It is of advantage to initially run the process in a semi-continuous manner during start-up so that an enrichment of the salt-laden constituents in the liquid phase 20 of the second vessel 200 is achieved by operating initially only the first vessel 100 continuously after a certain concentration of salt-laden constituents has been achieved in the liquid phase 14 forming there, and reversing to a completely continuous mode only after having achieved a corresponding concentration of salt-laden constituents in the liquid phase 20 of the second vessel 200 by discharging a partial stream 22 of the liquid phase 20 then continuously from the second vessel 200.

Applying this mode of operation makes it possible to reduce amine losses down to a minimum. By means of this process, it is possible to achieve reclaimer efficiency degrees of more than 99%.

Considering a 800 MW coal-fired power plant, the result is savings accounting for approx. 25 million € per year as compared to an operating mode of a conventional prior art evaporator reclaimer.

By means of the inventive process mode, it is also possible to perform a removal of $CO_2$ and/or $H_2S$, and/or HCN, and/or mercaptans from flue gases without the need for an additional NaOH scrubbing prior to the actual amine scrubbing for residual removal of $SO_x$ from flue gas. This scrubbing is, for example, operated according to the process described in DE 3408851 A1. This conventional acid gas scrubbing is then followed by the scrubbing according to the inventive process. This is to be considered as an advantageous application of the inventive process in an industrial plant. This is feasible because amine losses are reduced to a sufficiently low level by implementing the inventive reclaimer operating mode.

The invention claimed is:

1. A process for removal of heat stable salts thermally non-regenerable in a temperature range from 0° C. to 200° C. from organic solvents in an aqueous solution by evaporation comprising steps of:

(a) placing an aqueous solution containing organic solvents with a normal boiling point being higher than that of water and heat stable salts forming a liquid phase into a first vessel and evaporating water in the first vessel, (b) passing the liquid phase containing the organic solvents and the heat stable salts from the first vessel into a second vessel, (c) passing water in vaporous form, liquid form, or both into the second vessel, (d) evaporating water and a portion of the organic solvents as a vaporous phase and discharging the vaporous phase from the second vessel, (e) enriching the heat stable salts in concentration in a remaining liquid phase of the second vessel, and, (f) discharging a partial stream of the remaining liquid phase from the second vessel.

2. The process according to claim 1 further comprising steps of determining a concentration of the heat stable salts of the liquid phase formed in the first vessel, and passing the liquid phase of the first vessel into the second vessel as soon as the concentration of the heat stable salts of the liquid phase to be carried over has reached a maximally admissible concentration at which the heat stable salts are soluble in the liquid phase.

3. The process according to claim 2 further comprising steps of passing the liquid phase of the first vessel into the second vessel as soon as the concentration of the heat stable salts in the liquid phase is 5 to 35% by wt., 5 to 25% by wt., 5 to 15% by wt., or 8 to 12% by wt.

4. The process according to claim 1 further comprising steps of determining the salt concentration of the liquid phase formed in the second vessel, and discharging a partial stream of the liquid phase from the second vessel as soon as the concentration of the heat stable salts of the liquid phase to be discharged has reached a maximally admissible concentration at which the heat stable salts are soluble in the liquid phase.

5. The process according to claim 4 further comprising a step of discharging a partial stream of the liquid phase from the second vessel as soon as the concentration of the heat stable salts in the liquid phase is 25 to 65% by wt., 40 to 65% by wt., 45 to 65% by wt., or 55 to 65% by wt.

6. The process according to claim 1 further comprising a step of externally heating, cooling, or both the first vessel, the second vessel, or both.

7. The process according to claim 1, wherein step (c) is carried out before step (b).

8. The process according to claim 1 further comprising a step of producing a concentrated salt solution depleted in organic constituents as wastewater that encompasses the liquid phase formed in the second vessel.

9. The process according to claim 1 further comprising a step of supplying a partial stream of a main circulating stream of an industrial plant encompassing organic solvent(s) burdened with heat stable salts to the first vessel.

10. The process according to claim 1 further comprising a step of returning the vaporous phases of the first vessel, the second vessel, or both formed by evaporation into a main circulating stream of an industrial plant.

11. The process according to claim 1 further comprising steps of:

(h) continuously passing the liquid phase formed in the first vessel into the second vessel, (i) continuously passing water in vaporous form, liquid form, or both into the second vessel, (j) controlling supply of heat, discharge of heat, or both, (k) continuously evaporating water and portions of the organic solvents contained as a vaporous phase,
(l) discharging the vaporous phase from the second vessel,
(m) enriching the heat stable salts in concentration in the liquid phase forming in the second vessel,
(n) continuously discharging a partial stream of the liquid phase formed in the second vessel from the second vessel as a wastewater stream which encompasses a concentrated salt solution depleted in the organic solvents, and
(o) returning vaporous phases of the first vessel, the second vessel, or both which are formed by evaporation into a main process stream of an industrial plant.

12. The process according to claim 1 further comprising a step of supplying a strong base to the first vessel, the second vessel, or both.

13. The process according to claim 1 further comprising a step of removing $CO_2$, $H_2S$, HCN, mercaptans, or a combination thereof from flue gases.

\* \* \* \* \*